US008452802B2

(12) United States Patent
Chen et al.

(10) Patent No.: US 8,452,802 B2
(45) Date of Patent: May 28, 2013

(54) DISTRIBUTED AUDIO VISUAL SYSTEM AND CONTENT DIRECTORY MANAGEMENT SYSTEM AND METHOD THEREOF

(75) Inventors: Chi-Chun Chen, Hsinchu (TW); Jian-Hong Liu, Kaohsiung County (TW); Yi-Chang Zhuang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 573 days.

(21) Appl. No.: 12/337,592

(22) Filed: Dec. 17, 2008

(65) Prior Publication Data
US 2009/0287652 A1 Nov. 19, 2009

(30) Foreign Application Priority Data
May 13, 2008 (TW) ................................ 97117557 A

(51) Int. Cl.
*G06F 17/30* (2006.01)
(52) U.S. Cl.
USPC .......................................................... 707/769
(58) Field of Classification Search
USPC .................................................. 707/802, 223
See application file for complete search history.

(56) References Cited

U.S. PATENT DOCUMENTS

| | | | | |
|---|---|---|---|---|
| 7,526,573 | B2 * | 4/2009 | Busey | 709/246 |
| 7,739,411 | B2 * | 6/2010 | Messer et al. | 709/248 |
| 7,890,470 | B2 * | 2/2011 | Han et al. | 707/656 |
| 8,065,335 | B2 * | 11/2011 | Min et al. | 707/793 |
| 2003/0046703 | A1 | 3/2003 | Knowles et al. | |
| 2004/0193609 | A1 | 9/2004 | Phan et al. | |
| 2005/0022210 | A1 * | 1/2005 | Zintel et al. | 719/318 |
| 2005/0235334 | A1 * | 10/2005 | Togashi et al. | 725/117 |
| 2006/0004939 | A1 * | 1/2006 | Edwards et al. | 710/302 |
| 2006/0095628 | A1 * | 5/2006 | Ludwig et al. | 710/302 |
| 2006/0161635 | A1 * | 7/2006 | Lamkin et al. | 709/217 |
| 2006/0265508 | A1 * | 11/2006 | Angel et al. | 709/230 |
| 2007/0078959 | A1 * | 4/2007 | Ye | 709/223 |
| 2007/0118606 | A1 | 5/2007 | Duncan et al. | |
| 2007/0156809 | A1 * | 7/2007 | Dickinson et al. | 709/203 |
| 2007/0226312 | A1 * | 9/2007 | Stirbu et al. | 709/217 |

(Continued)

FOREIGN PATENT DOCUMENTS

CN 101098339 1/2008

OTHER PUBLICATIONS

"First Office Action of China Counterpart Application", issued on Nov. 30, 2010, p. 1-p. 6.

*Primary Examiner* — Sheree Brown
(74) *Attorney, Agent, or Firm* — Jianq Chyun IP Office

(57) ABSTRACT

A distributed audio visual (AV) system including a plurality of media servers, a media renderer, and a control point which are connected to each other via a peer-to-peer network is provided. Each of the media servers includes a content directory management unit (CDMU) and a query content information (QCI) module, wherein the CDMU includes a synchronizer module and a content information maintainer (CIM) module. The synchronizer module synchronizes content information of AV contents stored in all the media servers. The CIM module records the content information and establishes an integrated content directory list according to the content information. The QCI module queries the content information. The control point obtains the integrated content directory list from one of the media servers and queries the content information related to all the AV contents, so as to control the media renderer to play the AV contents.

19 Claims, 3 Drawing Sheets

U.S. PATENT DOCUMENTS

2007/0260652 A1\* 11/2007 Kaarela et al. ................ 707/205
2007/0271310 A1\* 11/2007 Han et al. ...................... 707/201
2008/0077668 A1\* 3/2008 Oh et al. ....................... 709/205
2009/0319479 A1\* 12/2009 Min et al. .......................... 707/3

\* cited by examiner

DISTRIBUTED AUDIO VISUAL SYSTEM AND CONTENT DIRECTORY MANAGEMENT SYSTEM AND METHOD THEREOF

CROSS-REFERENCE TO RELATED APPLICATION

This application claims the priority benefit of Taiwan application serial no. 97117557, filed on May 13, 2008. The entirety of the above-mentioned patent application is hereby incorporated by reference herein and made a part of specification.

BACKGROUND OF THE INVENTION

1. Field of the Invention

The present invention generally relates to an audio visual (AV) system, a content directory management system thereof, and a content directory management method thereof, and more particularly, to a distributed AV system, a content directory management system thereof, and a content directory management method thereof.

2. Description of Related Art

Nowadays, ever-increasing multimedia data is shared between digital devices through the Internet along with the development of Internet technology and the generation of digital and web-enabled household appliances. Thus, more convenient digital content sharing mechanisms, such as the universal plug and play (UPnP) technique, are developed in order to meet users' requirement.

The UPnP technique is a standard promulgated by the UPnP forum which is lead by the Microsoft Corp., and a peer-to-peer network structure especially designed for smart devices, wireless devices, and computers is provided in the UPnP technique. According to the UPnP technique, data transmission and control can be carried out between different devices through the Internet regardless of where the devices are located. A distributed and open network structure is provided by the UPnP technique, and the network structure has the functions of zero-configuration and automatic discovery of other devices. With the UPnP structure, a device can dynamically join a network, automatically obtain an Internet protocol (IP) address from the network, detect other devices in the network, share its resources over the network, and obtain resources from other devices in the network.

UPnP audio visual (AV) is a set of standards established based on the UPnP technique regarding the transmission of AV data. Generally, an AV system having the structure of UPnP AV includes a media server, a media renderer, and a control point. The media server is a medium used for storing AV contents, and the AV contents can be selected by a user and played in a selected media renderer. The user can select the AV contents provided by the media server through a user interface of the control point and select a media renderer for playing the selected AV content. The control point sets the media server and the media renderer by issuing UPnP actions so as to allow the media server and the media renderer to transmit AV contents using a transmission protocol (for example, HTTP GET or RTP, etc) and a content format (for example, MPEG2, MPEG4, MP3, or WMA, etc) supported by both the media server and the media renderer, so that the AV contents can be transmitted by the media server directly to the media renderer without delivering by way of the control point.

The UPnP technique allows different devices to be plugged and played on a network and to share resources over the same. However, along with the diversification of AV content storage devices (i.e. the media servers), it is difficult and inconvenient to those users who are not familiar with computers to read the AV contents distributed in different AV content storage devices when the content directories of the devices are all different. Thus, how to effectively integrate the content directories of different AV content storage devices is one of the most important subjects for implementing a distributed AV system based on a peer-to-peer network.

According to the U.S. Patent No. US-2003/0046703, a primary media server is appointed among a plurality of media servers and an aggregator module and a categorizer module are disposed in the primary media server. Besides, a contributor module is disposed in each of the media servers, wherein the contributor module monitors its own AV content and provides content information related to its own AV content to the primary media server. The aggregator module and the categorizer module of the primary media server combine and categorize the content information provided by the contributor modules of the other media servers. Accordingly, a user can obtain all the AV contents in the network by querying the aggregator module of the primary media server. According to the U.S. Patent No. US-2004/0193609, a primary media server is appointed among a plurality of media servers, and a control point module is embedded in the primary media server. Content information provided by the other media servers are discovered and browsed by using the control point module, and all the content information is then combined by using a master content directory service (MCDS) module of the primary media server. Thus, a user can obtain all the AV contents by directly handshaking with the MCDS module of the primary media server.

As described above, in the conventional content directory management techniques, a media server is appointed as a primary media server and the content directories of other media servers are integrated by this primary media server.

SUMMARY OF THE INVENTION

The present invention generally relates to a distributed audio visual (AV) system, a content directory management system thereof, and a content directory management method thereof, wherein integrated content directories are provided.

The present invention provides a content directory management system suitable for managing AV contents stored in a plurality of media servers. The content directory management system includes a content directory management unit (CDMU) and a query content information (QCI) module. The CDMU includes a synchronizer module and a content information maintainer (CIM) module. The synchronizer module synchronizes content information related to the AV contents, and the CIM module records the content information related to the AV contents and establishes an integrated content directory list according to the content information related to the AV contents. The QCI module queries the content information related to the AV contents. The CDMU and the QCI module are disposed in each of the media servers, and the media servers are connected to each other via a peer-to-peer network.

The present invention provides a content directory management method suitable for managing AV contents stored in a plurality of media servers. The content directory management method includes synchronizing content information related to all the AV contents between the media servers. The content directory management method further includes recording the content information related to all the AV contents in each of the media servers and establishing an integrated content directory list in each of the media servers according to the content information related to all the AV contents. The content directory management method also includes providing the integrated content directory list from one of the media servers to the control point, wherein the media servers and the control point are connected via a peer-to-peer network.

The present invention provides a distributed AV system including a plurality of media servers, at least one media renderer, a plurality of CDMUs, a plurality of QCI modules, a control point, and a peer-to-peer network. Each of the media servers has a content storage unit for storing an AV content. The CDMUs are disposed in each of the media servers and respectively include a synchronizer module and a CIM module, wherein the synchronizer module synchronizes content information related to the AV content stored in each of the media servers, and the CIM module records the content information related to the AV contents and establishes an integrated content directory list according to the content information related to the AV contents. The QCI modules are disposed in each of the media servers for querying the content information. The media renderer renders the AV contents. The control point receives the integrated content directory list from one of the media servers, queries the content information related to the AV contents through the QCI module of the media server according to the integrated content directory list, and then controls the media renderer to render the AV content. The peer-to-peer network connects the media servers, the media renderer, and the control point which are disposed distributedly.

According to the present invention, the content information of all the AV contents in a distributed AV system is synchronized and integrated by using CDMUs. Thereby, a single content directory is provided to a user so that the user can read the AV contents conveniently.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
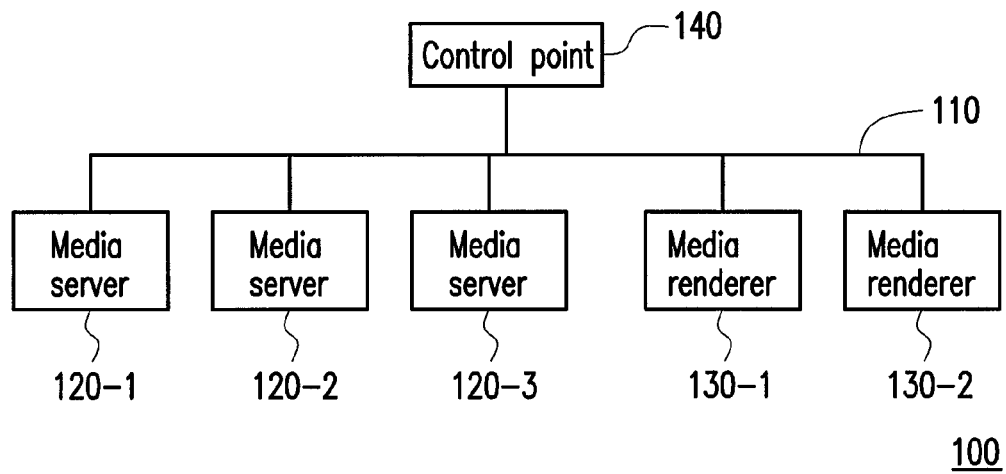
FIG. 1 is a schematic block diagram of a distributed audio visual (AV) system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram of a distributed audio visual (AV) system according to an embodiment of the present invention.

Referring to FIG. 1, the distributed AV system 100 includes a peer-to-peer network 110, a media server 120-1, a media server 120-2, a media server 120-3, a media renderer 130-1, a media renderer 130-2, and a control point 140.

The media server 120-1, the media server 120-2, the media server 120-3, the media renderer 130-1, the media renderer 130-2, and the control point 140 are connected to each other via the peer-to-peer network 110. In the present exemplary embodiment, the peer-to-peer network 110 is implemented as a universal plug and play (UPnP) network. UPnP is a network structure which allows any smart appliance, wireless device, or personal computer to achieve a peer-to-peer network connection. The concept of "plug and play" is adopted by the UPnP technique so that each device can dynamically join or leave a network without any device configuration and can automatically discover other devices in the network. To be more specific, the distributed AV system 100 is implemented with a UPnP AV structure, and accordingly the control point 140 can automatically discover and control the media server 120-1, the media server 120-2, the media server 120-3, the media renderer 130-1, and the media renderer 130-2 connected to the peer-to-peer network 110. However, it should be understood that the present invention is not limited to UPnP network; instead, any network which allows a device to automatically join or leave the network without any additional configuration and to achieve a peer-to-peer network connection can be applied in the present invention. In addition, even though a wired peer-to-peer network is adopted in the present exemplary embodiment, the present invention may also be applied to a wireless peer-to-peer network or a peer-to-peer network having both wired and wireless connections.

The media server 120-1, 120-2, and 120-3 are used for storing AV contents. The AV contents include films, images, or music stored in any format (for example, MPEG2, MPEG4, MP3, and WMA, etc). It should be noted that even though three media servers are described in the present exemplary embodiment, the present invention is not limited thereto, and the distributed AV system 100 may include any number of media servers.

The media renderers 130-1 and 130-2 are used for playing the AV contents stored in the media servers 120-1, 120-2, and 120-3 under the control of the control point 140. In particular, with the UPnP AV structure, the control point 140 appoints the media renderers 130-1 and 130-2 to directly receive the AV contents from the media servers 120-1, 120-2, and 120-3 by issuing UPnP actions and controls the media renderers 130-1 and 130-2 to play the AV contents. It should be noted that even though two media renderers are described in the present exemplary embodiment, the present invention is not limited thereto, and the distributed AV system 100 may include any number of media renderers.

Figure 2:
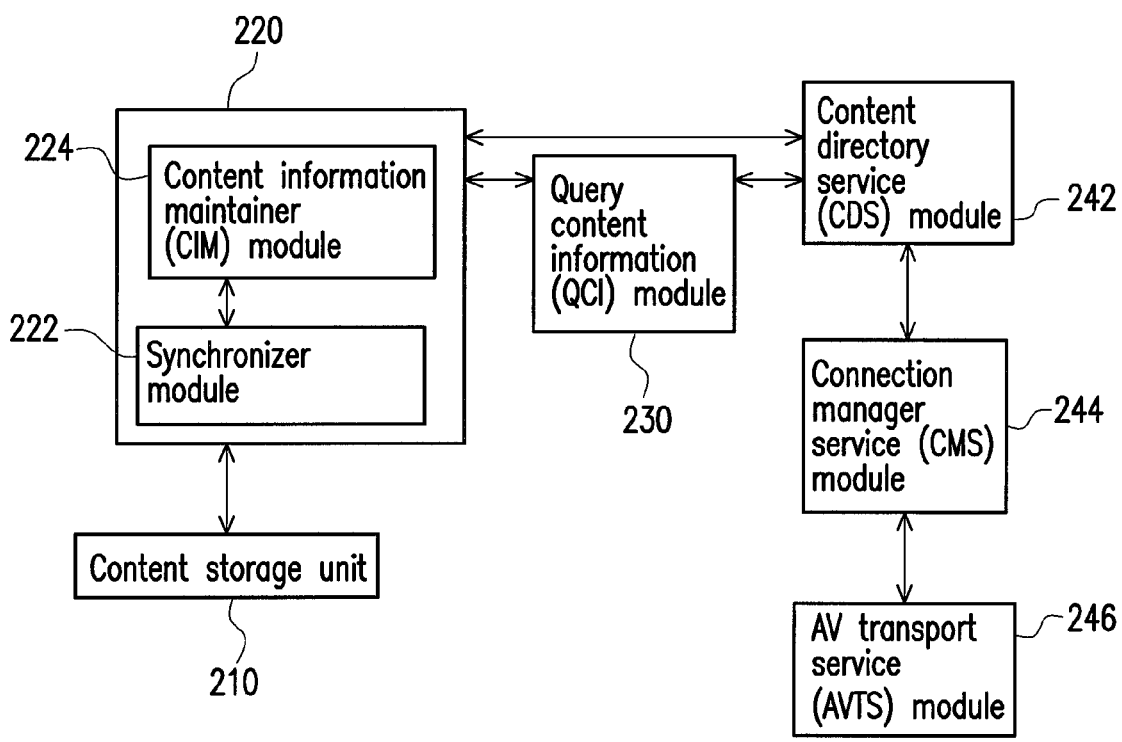
FIG. 2 is a schematic block diagram of a media server according to an embodiment of the present invention.

FIG. 2 is a schematic block diagram of a media server according to an embodiment of the present invention. The media servers 120-1, 120-2, and 120-3 have the same structure, and only the media server 120-1 will be described below as an example.

Referring to FIG. 2, the media server 120-1 includes a content storage unit 210 and a content directory management system having a content directory management unit (CDMU) 220 and a query content information (QCI) module 230. The content storage unit 210 is used for storing the AV content. In the present exemplary embodiment, the content storage unit 210 is a hard disk. However, the content storage unit 210 may be any storage medium suitable for storing data, such as a non-volatile memory or a CD.

The CDMU 220 is used for recording and managing the content information and directory information related to the AV content which are stored in the content storage unit 210. To be specific, the CDMU 220 includes a synchronizer module 222 and a content information maintainer (CIM) module 224.

Figure 3:
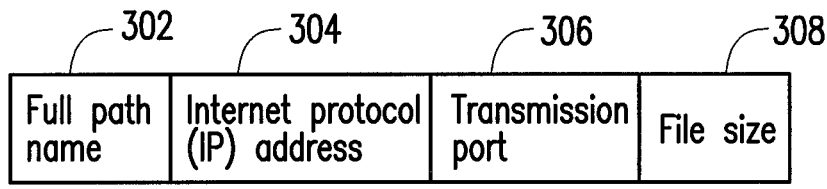
FIG. 3 illustrates the data structure of content information according to an embodiment of the present invention.

The synchronizer module 222 synchronizes the content information of all the AV contents shared over the distributed AV system 100. To be specific, the synchronizer module 222 of the media servers 120-1 transmits the content information of the AV contents stored in the media servers 120-1 to the media servers 120-2 and 120-3, and receive the content information of the AV contents from the media servers 120-2 and 120-3, so as to synchronize the content information of the AV contents stored in all the media servers (the media servers 120-1, 120-2, and 120-3). As a result, each of the media servers obtains the content information of all the AV contents in the distributed AV system 100. The synchronizer modules 222 are turned on whenever a media server joins the peer-to-peer network 110 so that the content information can be transmitted between the media servers. Besides, if the AV content stored in any media server is changed during the system operation, the synchronizer module 222 is started to transmit the updated content information to the synchronizer modules of other media servers, so as to update the AV contents stored therein to the latest state. For example, as shown in FIG. 3, the content information related to AV content includes a full path name field 302, an Internet protocol (IP) address field 304, a transmission port field 306, and a file size field 308.

The CIM module 224 records the content information synchronized by the synchronizer module 222 and establishes an integrated content directory list according to the synchronized content information. The integrated content directory list is the integrated content directory of the AV contents stored in all the media servers in the distributed AV system 100 and which is provided to the control point 140. Accordingly, a user operating the control point 140 can easily search for an AV content through the integrated content directory list.

Figure 4:
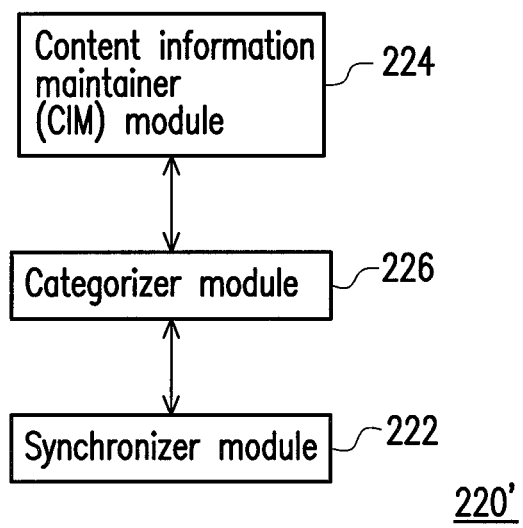
FIG. 4 is a schematic block diagram of a content directory management unit (CDMU) according to another embodiment of the present invention.

In an embodiment of the present invention, the CDMU may further include a categorizer module 226 (as the CDMU 220' illustrated in FIG. 4), and the categorizer module 226 categorizes the content information of the AV contents according to the file types of the AV contents. For example, the collected content information may be categorized into four groups: films, music, images, and others, such that the user can search for an AV content more conveniently.

The QCI module 230 queries the content information of the AV contents stored in all the media servers. To be specific, when the control point 140 is desired to read a specific AV content, it queries the CDMU 220 of the media server 120-1 about information related to the AV content through the QCI module 230 of the media server 120-1. In particular, when the desired AV content is not stored in the media server 120-1, the control point 140 obtains the content information of the specific AV content through the QCI module 230 and then controls the media server which stores the specific AV content (for example, the media server 120-2 or the media server 120-3) according to the content information.

In the present exemplary embodiment, the distributed AV system 100 is implemented with the UPnP AV structure. Thus, the media server 120-1 further includes a content directory service (CDS) module 242, a connection manager service (CMS) module 244, and an AV transport service (AVTS) module 246.

In the UPnP AV structure, the CDS module 242 allows the control point 140 to discover the media server 120-1 and transmits the integrated content directory list and the content information of the AV contents to the control point 140. To be specific, after establishing the integrated content directory list, the CIM module 224 presents the integrated content directory list in a user interface (not shown) of the control point 140 through the CDS module 242. Besides, when the control point 140 queries the CDMU 220 about a specific AV content through the QCI module 230, the content information of the specific AV content is transmitted to the control point 140 through the CDS module 242.

In the present exemplary embodiment, the QCI module 230 is implemented as an independent element coupled to the CDS module 242. However, in another embodiment of the present invention, the QCI module 230 may also be implemented in the CDS module 242.

The CMS module 244 processes the connections between the media server 120-1 and other devices in the peer-to-peer network 110 under the control of the control point 140. For example, when the control point 140 is desired to play the AV content stored in the media server 120-1 in the media renderer 130-1, the CMS module 244 of the media server 120-1 processes the connection between the media server 120-1 and the media renderer 130-1.

The AVTS module 246 controls the playing of the AV content stored in the media server 120-1 under the control of the control point 140. For example, when the control point 140 commands the media renderer 130-1 to play the AV content stored in the media server 120-1, the AVTS module 246 controls the AV content (for example, to stop, advance, rewind, and pause, etc) according to the control of the control point 140.

It should be mentioned that in the present exemplary embodiment, one of the media servers 120-1, 120-2, and 120-3 is set as a primary media server and the other two media servers are set as secondary media servers. In the present exemplary embodiment, the primary media server and the secondary media servers are set by enabling or disabling the CDS modules thereof. In particularly, according to the present exemplary embodiment, the control point 140 in the distributed AV system 100 discovers only the primary media server but not the secondary media servers. For example, when the distributed AV system 100 is initialized, the CDS module 242 of the media server 120-1 is enabled so that the media server 120-1 is set as the primary media server, and the CDS modules of the media servers 120-2 and 120-3 are disabled so that the media servers 120-2 and 120-3 are set as secondary media servers. Thus, when the distributed AV system 100 is initialized, the control point 140 discovers only the media server 120-1 and obtains the integrated content directory list only from the media server 120-1. Because the synchronizer module 222 of the media server 120-1 synchronizes the content information to all the media servers in the peer-to-peer network 110 (i.e. the media servers 120-2 and 120-3), the integrated content directory list obtained by the control point 140 from a single entry point (i.e. the media server 120-1) can present the information of AV contents stored in all the media servers in the peer-to-peer network 110.

Additionally, in the distributed AV system 100 of the present exemplary embodiment, when the CDS module of the primary media server (for example, the media server 120-1) encounters an abnormity (for example, a malfunction occurs) and accordingly cannot provide any service, the CDS module of a secondary media server is automatically enabled so that the secondary media server can serve as the primary media server. To be specific, when the synchronizer module of the secondary media server cannot synchronize with the synchronizer module of the primary media server, the synchronizer module of the secondary media server determines that the primary media server is in an abnormal state, and the synchronizer module of the secondary media server enables the CDS module thereof to provide the integrated content directory list to the control point. In the present exemplary embodiment, as long as any one of the secondary media servers detects that the primary media server is in an abnormal state, the CDS module of this secondary media server is automatically enabled to allow this secondary media server to server as the new primary media server.

For example, if the media server 120-1 encounters an abnormity and the synchronizer module of the media server 120-3 first synchronizes with the synchronizer module of the media server 120-1 and accordingly discovers that the media server 120-1 is in an abnormal state, the synchronizer module of the media server 120-3 detects that there is no primary media server in the peer-to-peer network 110, and accordingly the media server 120-3 enables the CDS module thereof to serve as the primary media server. After that, when the synchronizer module of the media server 120-2 synchronizes with the synchronizer module of the media server 120-1 and discovers that the media server 120-1 is in the abnormal state, the synchronizer module of the media server 120-2 detects that there is already a new primary media server (i.e. the media server 120-3) in the peer-to-peer network 110, and accordingly, the media server 120-2 does not enable the CDS module thereof.

Figure 5:
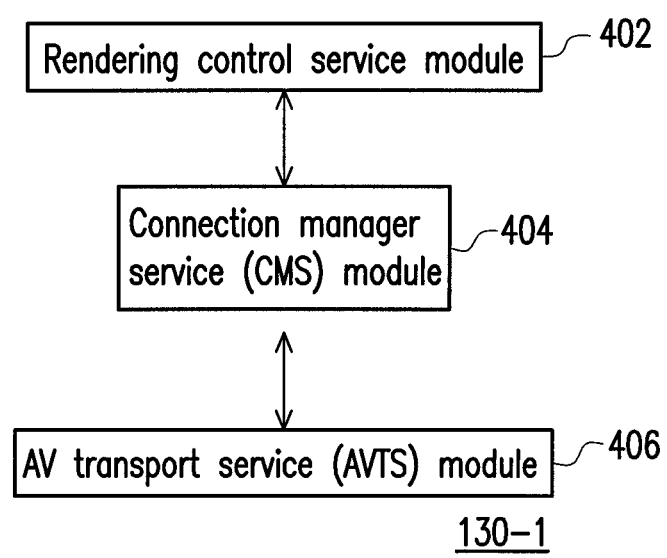
FIG. 5 is a schematic block diagram of a media renderer according to an embodiment of the present invention.

FIG. 5 is a schematic block diagram of a media renderer according to an embodiment of the present invention. The media renderers 130-1 and 130-2 have the same structure, and accordingly only the media renderer 130-1 is described below as an example.

Referring to FIG. 5, in the present exemplary embodiment, the distributed AV system 100 is implemented with an UPnP AV structure. Thus, the media renderer 130-1 includes a rendering control service module 402, a CMS module 404, and an AVTS module 406.

The rendering control service module 402 allows the control point 140 to control the playing of the AV contents in the media renderer 130-1 (for example, volume control).

Similar to the CMS module 244, the CMS module 404 processes the connections between the media renderer 130-1 and other devices in the peer-to-peer network 110 under the control of the control point 140. For example, when the control point 140 is desired to play the AV content stored in the media server 120-1 in the media renderer 130-1, the CMS module 404 of the media renderer 130-1 processes the connections between the media renderer 130-1 and the media server 120-1. To be more specific, the CMS module 404 of the media renderer 130-1 and the CMS module 244 of the media server 120-1 communicate with each other by using the data transmission protocol and data format set by the control point 140.

Similar to the AVTS module 246, the AVTS module 406 controls the playing of the AV contents under the control of the control point 140. For example, when the control point 140 plays the AV content stored in the media server 120-1 in the media renderer 130-1, the AVTS module 406 controls the AV content (for example, to stop, advance, rewind, and pause, etc) according to the control of the control point 140. To be specific, the AVTS module 406 of the media renderer 130-1 and the AVTS module 246 of the media server 120-1 control the AV content correspondingly under the control of the control point 140.

Below, a content directory management method of the distributed AV system 100 will be described in detail with reference to FIG. 6.

Figure 6:
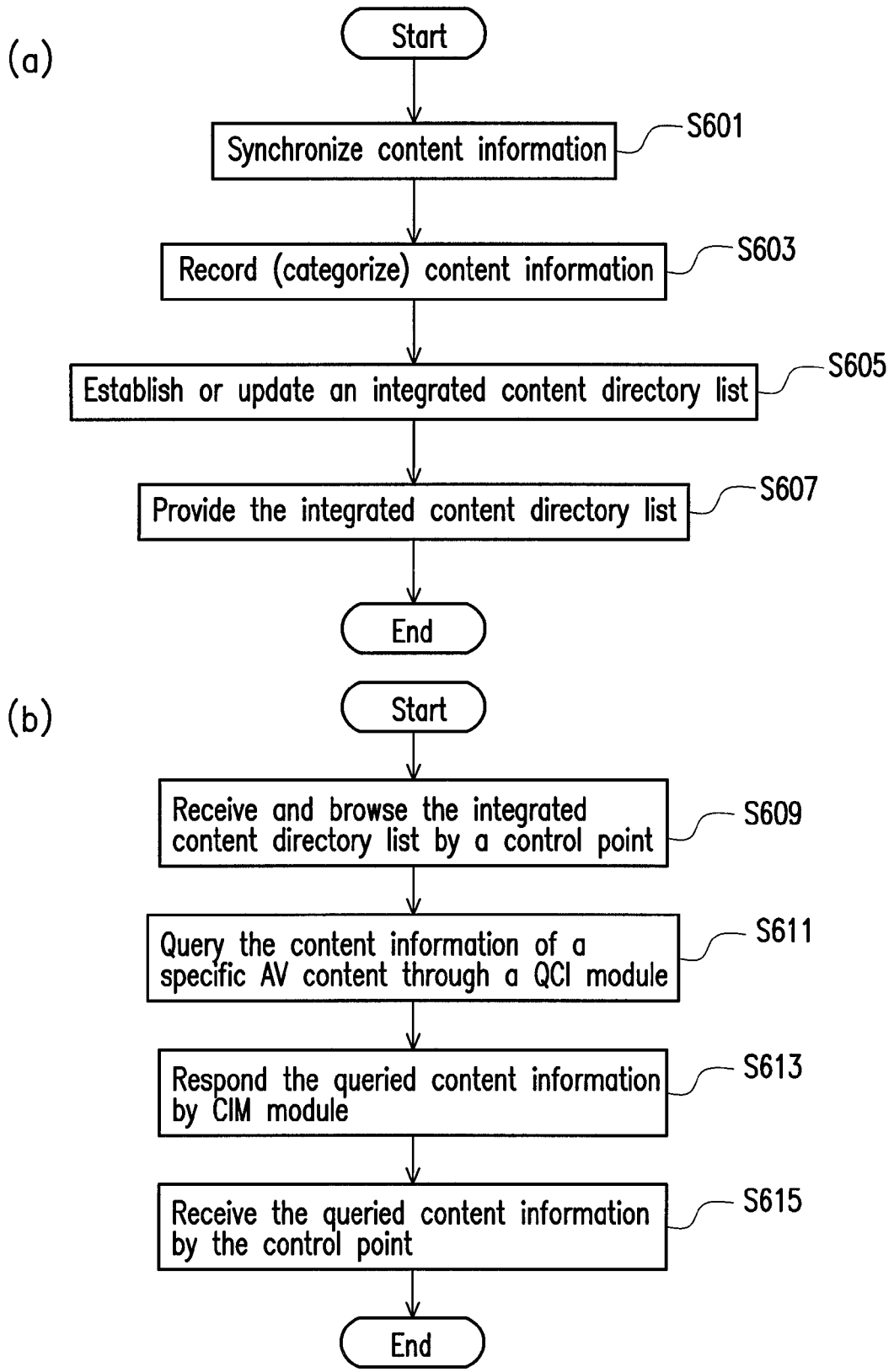
FIG. 6 is a flowchart of a content directory management method according to an embodiment of the present invention.

FIG. 6 is a flowchart of a content directory management method according to an embodiment of the present invention.

Referring to FIG. 6, the content directory management process can be divided into two phases, wherein the first phase is to synchronize the content information of all the media servers (i.e. the media servers 120-1, 120-2, and 120-3) and establish an integrated content directory list to be provided to the control point 140 according to the content information (as shown in FIG. 6(a)), and the second phase is to query the content information of the AV contents to the primary media server (for example, the media server 120-1) through the control point 140 (as shown in FIG. 6(b)).

In step S601, the content information related to the AV contents stored in the media servers 120-1, 120-2, and 120-3 is synchronized. Namely, the synchronizer modules of the media servers 120-1, 120-2, and 120-3 exchange the content information of the AV contents stored therein with each other.

Then, in step S603, the content information related to all the AV contents in the peer-to-peer network 110 is recorded in each of the media servers 120-1, 120-2, and 120-3. Namely, the CIM modules of the media servers 120-1, 120-2, and 120-3 respectively record the content information obtained by the synchronizer modules thereof.

After that, in step S605, the CIM module in each of the media servers 120-1, 120-2, and 120-3 establishes (or updates) an integrated content directory list according to the content information related to all the AV contents.

In an embodiment of the present invention, foregoing step S603 further includes categorizing the content information according to the file types of the AV contents. After that, in step S605, the integrated content directory list is established according to the categorized content information so that the integrated content directory list can be read more easily.

Finally, in step S607, the integrated content directory list is provided from only one of the media servers 120-1, 120-2, and 120-3 to the control point 140. For example, one of the media servers 120-1, 120-2, and 120-3 (for example, the media server 120-1) is set as the primary media server through the enabling of its CDS module, and accordingly this media server provides the integrated content directory list to the control point 140 through its CDS module. The method for setting the primary media server and secondary media servers has been described above therefore will not be described herein.

In an embodiment of the present invention, the content directory management method further includes that another media server (the media server 120-2 or the media server 120-3) automatically provides the integrated content directory list to the control point 140 when the original primary media server (for example, the media server 120-1) which provides the integrated content directory list to the control point 140 encounters an abnormity.

After the first phase is completed, the control point 140 obtains the content information of all the AV contents in the peer-to-peer network 110 during the second phase.

Referring to FIG. 6(b), in step S609, the control point 140 discovers the integrated content directory list provided by the primary media server (for example, the media server 120-1). The control point 140 presents the integrated content directory list in a display device (not shown) thereof so that a user can browse the integrated content directory list.

Thereafter, in step S611, the control point 140 queries the content information related to an AV content selected by the user from the integrated content directory list to the primary media server (for example, the media server 120-1). For example, the control point 140 queries the content information related to the AV content to the CIM module of the primary media server through the QCI module thereof.

Next, in step S613, the CIM module responds the requested content information to the QCI module.

Finally, in step S615, the control point 140 receives the desired content information. For example, the CIM module of the primary media server transmits the content information related to the AV content to the control point 140 through the CDS module.

In another embodiment of the present invention, the content directory management method further includes that the control point 140 connects the media server (for example, the media server 120-2) storing the AV content and the media renderer (for example, the media renderer 130-1) selected by the user for playing the AV content according to the received content information so as to play the AV content and perform subsequent playing control. The playing and control of the AV content is carried out by the rendering control service module of the media renderer and the CMS modules and AVTS modules of the media renderer and the media server.

In overview, according to the present invention, a CDMU and a QCI module are adopted in each media server of a distributed AV system for recording and synchronizing the content information and directories of AV contents stored in all the media servers, and one of the media servers is used by a control point as a single access entry, so that a user can browse the directories of all the AV contents in the AV system. Moreover, when the media server which provides the content directories encounter an abnormality, any one of the other media servers can automatically provide the content directories, so that the operation of the entire AV system will not be affected by the abnormal media server which provides the content directories originally.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A content directory management system, comprising:
a first media server, storing first audio visual (AV) contents, wherein the first media server includes a first content directory management unit (CDMU) and a first query content information (QCI) and the first CDMU includes a first synchronizer module and a first content information maintainer (CIM) module; and
a second media server, storing second AV contents, wherein the second media server includes a second CDMU and a second QCI and the second CDMU includes a second synchronizer module and a second CIM module,
wherein the first CIM module records first content information related to the first AV contents and the first synchronizer module transmits the first content information to the second synchronizer module,
wherein the second CIM module records second content information related to the second AV contents and the second synchronizer module transmits the second content information to the first synchronizer module,
wherein the first CIM module records a first synchronized content information in the first media server according to the first content information and the second content information and updates a first integrated content directory list in the first media server based on the first synchronized content information,
wherein the second CIM module records a second synchronized content information in the second media server according to the first content information and the second content information and updates a second integrated content directory list in the second media server based on the second synchronized content information,
wherein the first synchronized content information in the first media server is the same as the second synchronized content information in the second media server,
wherein the first QCI queries the first integrated content directory list and the second QCI queries the second integrated content directory list,
wherein the first media server and the second server are connected via a peer-to-peer network,
wherein the first CDMU further comprises a first categorizer module for categorizing the first synchronized content information according to the file types of the first AV contents and the second AV contents,
wherein the second CDMU further comprises a second categorizer module for categorizing the second synchronized content information according to the file types of the first AV contents and the second AV contents.

2. The content directory management system according to claim 1, wherein the peer-to-peer network comprises a universal plug and play (UPnP) network.

3. The content directory management system according to claim 2, wherein the first media server and the second media server respectively further include a content directory service (CDS) module, and the QCI module is embedded in the CDS module.

4. The content directory management system according to claim 3, wherein the CDS module of the first media server is enabled while the CDS modules of the second media server is disabled.

5. The content directory management system according to claim 4, wherein when the CDS module of the first media server encounters an abnormality, the second synchronizer module of the second media server enables the CDS module of the second media server.

6. The content directory management system according to claim 1, wherein the first synchronized content information comprises a full path name, an Internet protocol (IP) address, a transmission port, and a file size.

7. A content directory management method, for managing audio visual (AV) content stored in a plurality of media servers, the content directory management method comprising:
synchronizing content information related to the AV contents between the media servers;
categorizing the content information of the AV contents according to the file types of the AV contents;
recording the content information related to the AV contents in each of the media servers;
updating an integrated content directory list according to the content information related to the AV contents in each of the media servers;
providing the integrated content directory list from one of the media servers to a control point, wherein the media servers and the control point are connected via a peer-to-peer network;
querying the content information related to the AV contents from the one of the media servers according to the integrated content directory lists received by the control point; and sending the queried content information to the control point.

8. The content directory management method according to claim 7, wherein the peer-to-peer network is established based on an universal plug and play (UPnP) standard.

9. The content directory management method according to claim 7, further comprising using a content directory service (CDS) module of the media servers to allow the control point to discover the media servers and using the CDS module of the media servers to transmit the integrated content directory list of the AV contents and the content information of the AV contents to the control point.

10. The content directory management method according to claim 9, further comprising enabling the CDS module of the one of the media servers and disabling the CDS modules of the other media servers.

11. The content directory management method according to claim 10, wherein when the CDS module of the one of the media servers encounters an abnormity, the CDS module of any one of the other media servers is enabled.

12. The content directory management method according to claim 7, further comprising playing the AV contents in at least one media renderer connected to the peer-to-peer network under the control of the control point according to the queried content information.

13. The content directory management method according to claim 7, wherein the content information of the AV contents comprises a full path name, an IP address, a transmission port, and a file size.

14. A distributed audio visual (AV) system, comprising:
- a plurality of media servers, wherein each of media servers includes: a content storage unit for storing an audio visual (AV) content, and a content directory management unit (CDMU) having a synchronizer module for synchronizing content information related to the AV contents stored in each of the media servers, a content information maintainer (CIM) module for recording the content information and updating an integrated content directory list according to the content information, and a query content information (QCI) module for querying the content information;
- at least one media renderer, for rendering the AV contents;
- a control point, for receiving the integrated content directory list from one of the media servers, querying the content information related to the AV contents according to the integrated content directory list through the QCI module of the media server, and controlling the media renderer to render the AV contents;
- a peer-to-peer network, for connecting the media servers, the media renderer, and the control point;
- a plurality of content directory service (CDS) modules, respectively disposed in the media servers for allowing the control point to discover the media servers and for transmitting the integrated content directory list and the content information of the AV contents to the control point;
- at least one rendering control service module, disposed in the media renderer for controlling playing of the AV contents in the media renderer;
- a plurality of connection manager service (CMS) modules, respectively disposed in the media servers and the media renderer, for processing connections between the media servers and the media renderer under control of the control point; and
- a plurality of audio visual AV) transport service (AVTS) modules, respectively disposed in the media servers and the media renderer, for processing the rendering of the AV contents under the control of the control point,
- wherein each of the CDMUs further comprises a categorizer module for categorizing the content information of the AV contents according to the file types of the AV contents.

15. The distributed AV system according to claim 14, wherein the peer-to-peer network comprises an universal plug and play (UPnP) network.

16. The distributed AV system according to claim 14, wherein the CDS module of one of the media servers is enabled while the CDS modules of the other media servers are disabled.

17. The distributed AV system according to claim 16, wherein when the CDS module of the one of the media servers encounters an abnorrnity, the synchronizer module of any one of the other media servers enables the corresponding CDS module.

18. The distributed AV system according to claim 14, wherein the QCI module of each of the media servers is embedded in the CDS module of the media server.

19. The distributed AV system according to claim 14, wherein the content information of the AV contents comprises a full path name, an IP address, a transmission port, and a file size.

* * * * *